Dec. 24, 1963  E. R. ZIEGLER  3,115,599
WINDSHIELD WIPER ACTUATING MECHANISM
Filed Feb. 19, 1962  4 Sheets-Sheet 1

INVENTOR.
EUGENE R. ZIEGLER
BY
W. E. Finken
HIS ATTORNEY

Dec. 24, 1963   E. R. ZIEGLER   3,115,599
WINDSHIELD WIPER ACTUATING MECHANISM
Filed Feb. 19, 1962   4 Sheets-Sheet 2
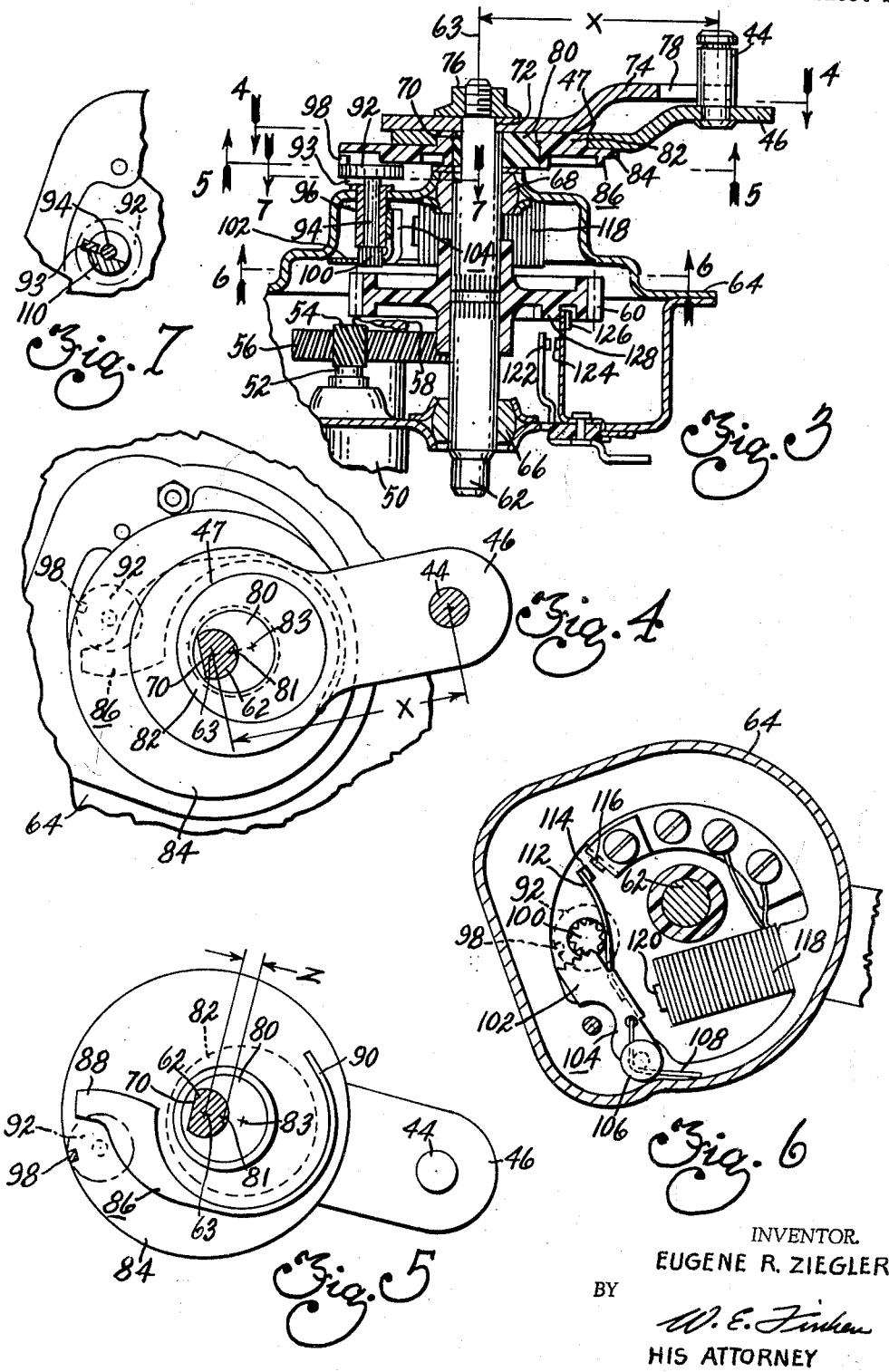
INVENTOR.
EUGENE R. ZIEGLER
BY
*W. E. Finken*
HIS ATTORNEY Dec. 24, 1963  E. R. ZIEGLER  3,115,599
WINDSHIELD WIPER ACTUATING MECHANISM
Filed Feb. 19, 1962  4 Sheets-Sheet 3

INVENTOR
EUGENE R. ZIEGLER
BY
W. E. Finken
HIS ATTORNEY

INVENTOR.
EUGENE R. ZIEGLER
BY
W. E. Finken
HIS ATTORNEY

United States Patent Office 3,115,599
Patented Dec. 24, 1963

3,115,599
WINDSHIELD WIPER ACTUATING MECHANISM
Eugene R. Ziegler, Spencerport, N.Y., assignor to General Motors Corporation, Detroit, Mich., a corporation of Delaware
Filed Feb. 19, 1962, Ser. No. 174,141
10 Claims. (Cl. 318—466)

This invention pertains to actuating mechanism for windshield wipers, and particularly to an improved electric motor driven actuating mechanism including variable throw crank means.

In my earlier application Serial No. 125,908 filed June 29, 1961, a simplified variable throw crank assembly for use with a spur gear drive is disclosed, this mechanism including a double eccentric for controlling the throw of the crank. The present invention relates to an improved double eccentric operated variable throw crank which is more reliable and more economical to manufacture than my earlier aforementioned mechanism. Accordingly, among my objects are the provision of windshield wiper actuating mechanism including double eccentric operated variable throw crank means; the further provision of an electric motor driven windshield wiper actuating mechanism including a double eccentric operated variable throw crank and a cyclically operated parking switch; and the still further provision of windshield wiper actuating mechanism including a unidirectional electric motor and electromagnetic means for controlling a variable throw crank.

The aforementioned and other objects are accomplished in the present invention by embodying a pair of relatively rotatable eccentrics in the crank drive in combination with an angularly movable abutment for controlling relative rotation between the two eccentrics. Specifically, the actuating mechanism includes a unidirectional electric motor connected through a spur gear reduction to an output shaft constituting a driving member. A first eccentric is keyed to the output shaft for rotation therewith, and a second eccentric is frictionally mounted on the first eccentric. A drive arm is rigidly connected to the output shaft and has an elongated radial slot adjacent its outer end for receiving a crank pin carried by a driven crank arm which is journalled on the second eccentric.

The second eccentric comprises a disc having an integral cam stop thereon having an arcuate extension subtending an angle of more than 180°. The cam stop on the second eccentric coacts with an angularly movable shifter mounted for movement about an axis radially displaced from the axis of the output shaft, and supported in the wiper unit housing. The shifter comprises a disc having an axial projection constituting an abutment which is engageable with the cam stop to vary the throw of the crank means by shifting the second, or outer, eccentric relative to the first, or inner, eccentric such that the axis of the inner eccentric is between the axis of the output shaft and the axis of the outer eccentric when the crank throw is a maximum, while the axis of the output shaft and the axis of the outer eccentric are on the same side of the axis of first eccentric when the throw of the crank is a minimum.

The shifter is electromagnetically controlled, and in the particular embodiment disclosed is gear driven through a sector gear formed on an armature. The armature also carries a leaf spring constituting the movable contact of a running switch for energizing the electric motor. The output of the spur gear drive is formed with a cam surface for cyclically actuating a parking switch during each revolution of the output shaft, such that if the running switch is opened when the wiper blades arrive at their inboard stroke ends, the motor will be deenergized and movement of the wiper blades will be arrested.

During normal running operation, the abutment lug on the shifter is disposed within the inner surface of the cam stop on the outer eccentric, such that upon rotation of the output shaft, rotation is imparted to both eccentrics, the driven crank and the drive arm. The throw of the driven crank remains constant, and accordingly, the wiper blades are driven throughout their normal running strokes between predetermined inboard and outboard stroke end positions. When the electromagnet is deenergized, the armature is spring actuated away from the magnet core and during rotation of the outer eccentric, the abutment on the shifter engages the cam stop thereby arresting rotation of the outer eccentric during continued rotation of the inner eccentric, the drive arm and the driven crank arm. During relative rotation between the inner and outer eccentrics, the throw of the crank is increased to a maximum whereat the abutment on the shifter is disposed outside of the outer surface of the cam stop on the outer eccentric. When the wiper blades arrive at their depressed parked positions, the parking switch will deenergize the motor.

When wiper operation is resumed, closure of the manual switch energizes the electromagnet to rotate the shifter to its running position, and also closes the running circuit to energize the electric motor. This results in rotation of the inner and outer eccentrics as well as the drive arm and the driven crank arm until the abutment lug on the shifter again engages the cam stop, whereat rotation of the second eccentric is arrested until the throw of the crank has been reduced to a minimum whereat the abutment lug on the shifter is again aligned to clear the inner surface of the cam stop.

Further objects and advantages of the present invention will be apparent from the following description, reference being had to the accompanying drawings, wherein a preferred embodiment of the present invention is clearly shown and wherein similar numerals denote similar parts throughout the several views.

Figure 2:
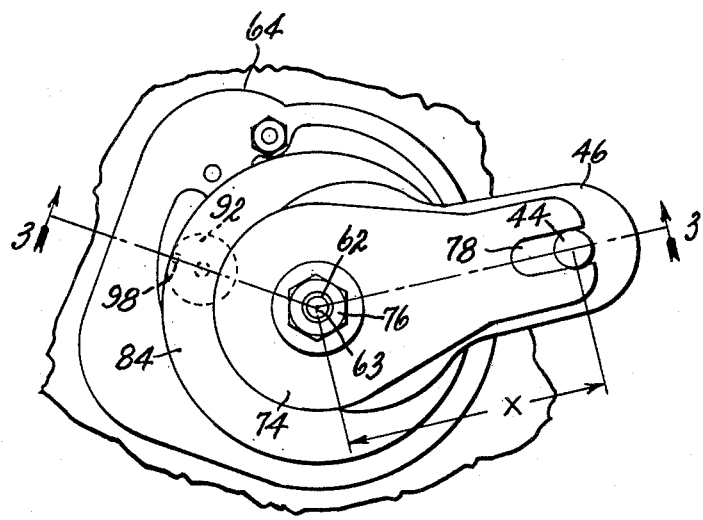
FIGURE 2 is a plan view of the crank mechanism in the parked position.

FIGURE 3 s a fragmentary sectional view taken along line 3—3 of FIGURE 2.

FIGURES 4, 5 and 6 are sectional views taken along lines 4—4, 5—5 and 6—6 of FIGURE 3.

FIGURE 7 is a fragmentary sectional view taken along line 7—7 of FIGURE 3.

Figure 8:
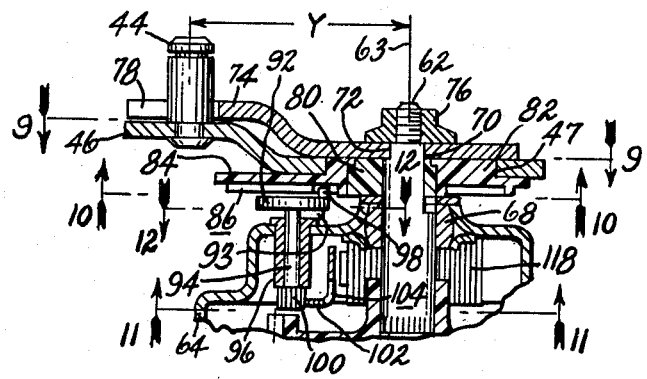

FIGURE 8 is a fragmentary sectional view similar to FIGURE 3 showing a crank mechanism in the running position.

Figure 9:
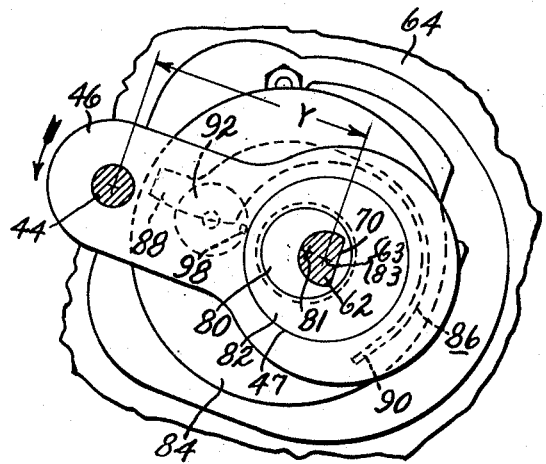
Figure 10:
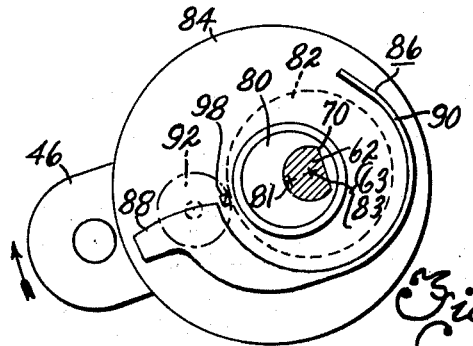

FIGURES 9 and 10 are sectional views taken along lines 9—9 and 10—10 of FIGURE 8, respectively.

Figure 12:
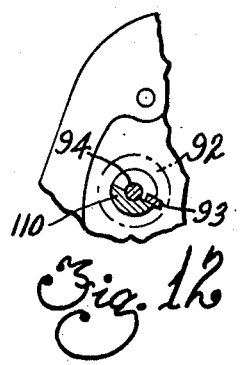
Figure 11:
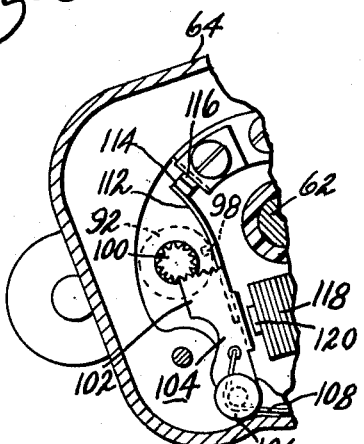

FIGURES 11 and 12 are fragmentary sectional views taken along lines 11—11 and 12—12 of FIGURE 8, respectively.

Figure 13:
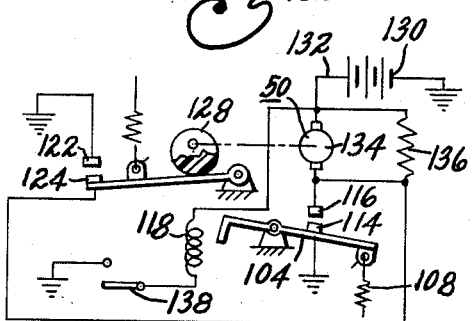
Figure 14:
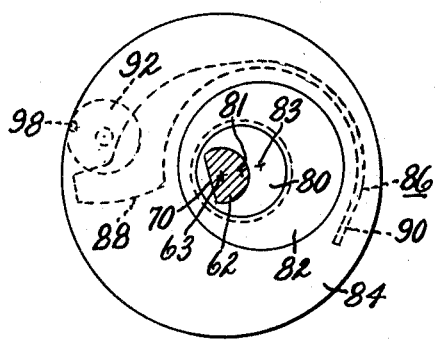

FIGURE 13 is an electrical schematic of an energizing circuit for the actuating mechanism.

FIGURES 14 through 20 are schematic views depicting the sequence of shifting from parking to running and back to parking.

Figure 1:
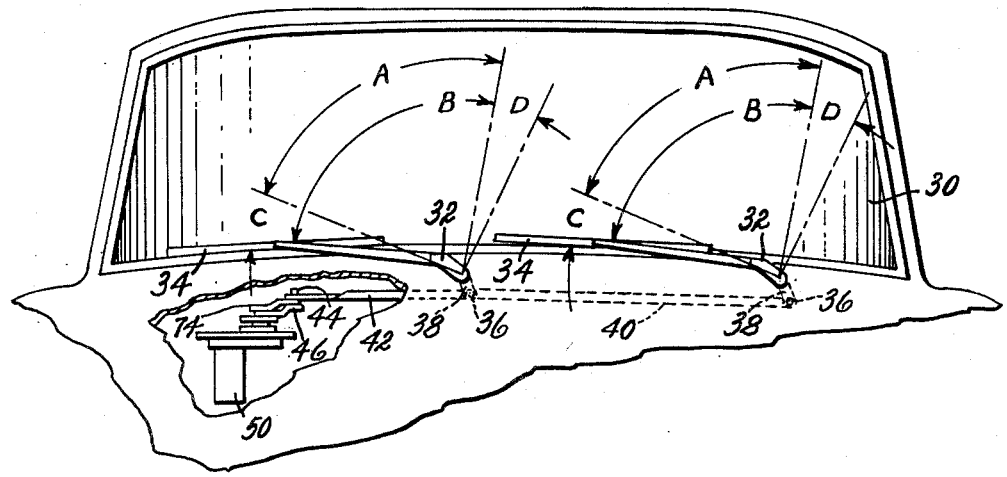
FIGURE 1 is a fragmentary view in elevation, with certain parts broken away, of a motor vehicle embodying the windshield wiper actuating mechanism of this invention.

With particular reference to FIGURE 1, a vehicle windshield wiper system is shown for a windshield 30 having a pair of arms 32 including spring hinge connected inner and outer sections which carry wiper blades 34. The wiper arms 32 are drivingly connected to pivot shafts 36 having crank arms 38 interconnected by a drive link 40. The drive link 40 is connected to a reciprocable motor operated link 42 pivotally attached to a crank pin 44. During rotation of the crank pin 44 reciprocation is imparted to the link 42 and to the link 40 so as to oscillate the wiper arms 32 and blades 34 symetrically, or in phase, across the outer surface of the windshield 30. This tandem wiper system moves the wiper blades 34 throughout running strokes A having predetermined inboard and outboard stroke end positions, and as pointed out more particularly hereinafter, the wiper blades can be moved to depressed parked positions beyond their normal inboard stroke end positions through an angle C against the lower rail of the windshield 30, as shown in FIGURE 1.

The crank pin 44 is carried by a crank arm 46 which is operated through a drive arm 74 from a unidirectional electric motor 50 that is mounted on the vehicle firewall to one side of the center line of the vehicle. As seen more particularly in FIGURE 3, the unidirectional electric motor 50 includes an armature shaft 52 having a spur gear pinion 54 meshing with a spur gear 56, the spur gear 56 having a spur gear hub 58 meshing with an output spur gear 60 suitably attached to an output shaft 62.

The output shaft 62 is journalled in a wiper unit housing 64 by spaced self-aligning bearings 66 and 68, and has diametrically opposed flats 70 and 72 adjacent its outer end. A drive arm 74 is secured to the outer end of the shaft 62 by a nut 76, and rotates in unison with the shaft 62 by reason of the flats 70 and 72. The drive arm 74 has an elongated radial slot 78 through which the crank pin 44 projects, whereby rotation of the drive arm 74 rotates the crank pin 44 and its associated driven crank arm 46.

As seen particularly in FIGURES 3 through 5, an inner eccentric 80 is secured to the output shaft 62, the axis 81 of the inner eccentric being displaced throughout the radial distance Z from the axis 63 of the output shaft 62. The eccentric 80 is keyed for rotation in unison with the output shaft 62 by reason of the flat 70. A second, or outer, eccentric 82, in the form of a disc 84, is frictionally journalled on the periphery of the inner eccentric 80. The eccentric 82 has an axis 83, and fits within a circular aperture 47 of the driven crank arm 46. The eccentric 82 is on the top side of the disc 84, and a cam stop 86 projects axially from the bottom side of the disc 84. As seen particularly in FIGURE 5, the cam stop 86 subtends an angle greater than 180° and includes an arcuate substantially radially extending stop portion 88 and an arcuate extension 90.

Ordinarily, the inner eccentric 80 and the outer eccentric 82 together with its disc 84 rotate in unison with the output shaft 62, the drive arm 74 and the driven crank arm 46, at which time the throw of the crank pin 44 remains constant. In order to vary the throw of the crank, the inner eccentric 80 is caused to rotate relative to the outer eccentric 82 and its disc 84 by arresting rotation of the outer eccentric 82 and its disc 84 during continued rotation of the inner eccentric. To accomplish this result the present mechanism includes a shifter in the form of a disc 92 attached to a stub shaft 94 journalled by a sleeve bearing 96 in the housing 64. The disc 92 has an axially extending abutment lug 98 projecting from its upper surface, and a pinion 100 is attached to the inner end of the shaft 94. Thus, the disc 92 is angularly movable relative to the housing and to the output shaft 62. The pinion gear 100, as seen in FIGURE 6, meshes with a sector gear 102 integral with an armature 104 pivotally supported on a pin 106 within the housing. The armature 104 is biased by a hairpin spring 108 to the position shown in FIGURE 6, this position being determined by engagement of a disc stop 93 with a fixed housing stop 110 as shown in FIGURE 7. Angular movement of the disc 92 is limited to approximately 180° by the stop 110.

The armature 104 carries a leaf spring 112 having a contact 114 engageable with a stationary contact 116 constituting the running switch for the motor 50. The armature 104 coacts with an electromagnet including a coil 118 and a core 120, such that when the coil 118 is energized, the armature 104 is attracted to the core 120 and thus pivots in a clockwise direction about the pin 106, as seen in FIGURE 6 so as to engage contact 114 with contact 116, and impart counterclockwise angular movement to the pinion gear 100. Conversely, when the coil 118 is deenergized, the hairpin spring 108 effects counterclockwise movement of the armature 104 to the position shown in FIGURE 6 thereby separating contacts 114 and 116 and effecting clockwise rotation of the pinion 100.

The wiper actuating mechanism includes a cyclically actuated parking switch comprising a stationary contact 122 and a movable contact 124 having a follower 126 engageable with a cam surface 128 integral with the output gear 60. The cam surface 128 is of sufficient arcuate extent to separate the contacts 122 and 124 during each revolution of the output gear 60 and to deenergize the motor 50 so that the output shaft 62 will coast to a standstill prior to reclosure of the parking switch.

Referring particularly to FIGURE 13, the energizing circuit for the wiper actuating mechanism includes a vehicle battery 130 having one terminal grounded and the other terminal connected to wire 132 and thence to the armature 134 of the motor and the shunt field winding 136. The wire 132 is also connected to the coil 118 and to a manual switch 138. When the manual switch 138 is closed, the coil 118 will be energized thereby attracting the armature 104 to close the running switch comprising contacts 114 and 116 thereby energizing the motor 50. The parking switch comprising contacts 124 and 122 is connected in parallel with the running switch comprising contacts 114 and 116 by a wire 140. The parking switch is shown as being schematically actuated by the motor driven cam 128. Accordingly, when the running switch 114 and 116 is closed, cyclical operation of the parking switch is of no effect, but when the running switch 114 and 116 is open, the motor is controlled by the parking switch and will be deenergized at a predetermined angular position, namely, at the inboard stroke end positions of the wiper blades.

Figure 17:
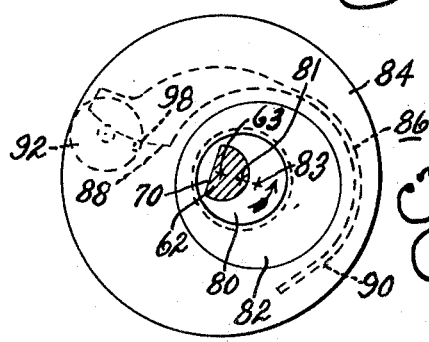

With particular reference to FIGURES 13 through 20, a complete cycle of operation will be described as regards the relative movement between the inner eccentric 80 and the outer eccentric 82 in moving the wiper blades from their parked positions, through running strokes, and back to their parked positions. When the manual switch 138 is closed, the electromagnetic coil 118 is energized thereby attracting the armature 104 and imparting counterclockwise rotation to the pinion gear 100 as seen in FIGURE 6. Simultaneously, the running switch 114, 116 is closed to energize the motor 50, and accordingly, rotation is imparted to the drive shaft 62 and the eccentrics 80 and 82 and the drive arm 74. At the same time, the shifter disc 92 is moved from the position of FIGURE 14 to the position of FIGURE 15 which, while less than 180°, results in engagement of the abutment lug 98 with the outer periphery of the cam stop 86. During rotation of the shaft 62 in the counterclockwise direction from the position of FIGURE 15 to the position of FIGURE 16, the lug 98 will clear the end of the arcuate extension 90, so that the disc 92 can complete its 180° movement with the lug 98 radially inward of the inner periphery of the cam stop 86. During continued rotation of the shaft 62, the stop portion 88 of the cam stop 86 will engage the lug 98 as shown in FIGURE 17, whereat continued rotation of the disc 84 and the outer eccentric 82 is arrested. It is at this point that the throw of the crank is altered by rotation of the eccentric 80 relative to the disc 84 and the eccentric 82 throughout 180° from the position of FIGURE 17 to the position of FIGURE 18, whereat the lug 98 is automatically disengaged from the stop portion 88 and is disposed radially inward of the inner periphery of the cam stop 86.

Figure 18:
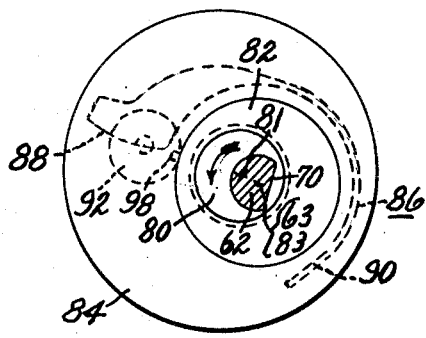
Figure 15:
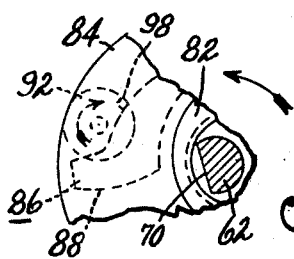
Figure 19:
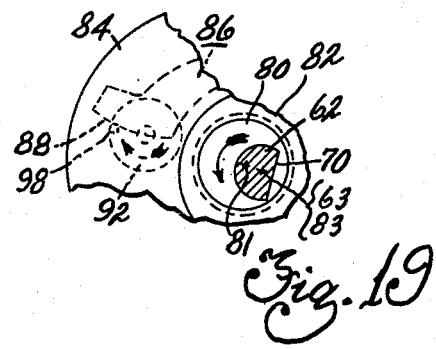
Figure 16:
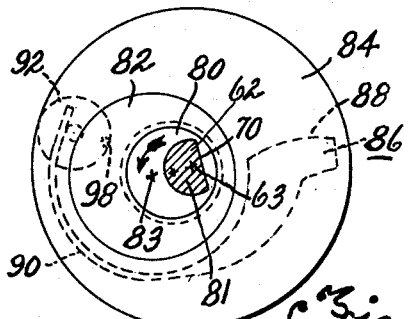
Figure 20:
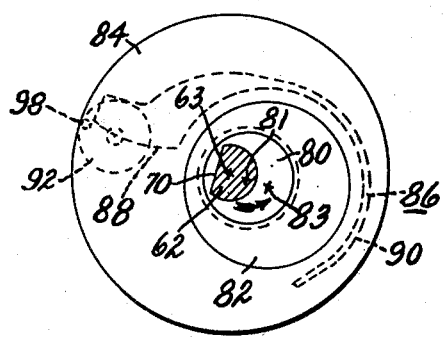

With the shifter disc 92 in the position of FIGURES 12 and 18, the wiper blades will move through their running strokes A between predetermined inboard and outboard stroke end positions. It can be seen that in the particular embodiment disclosed, the axes 63 of the shaft 62 and 83 of the eccentric 82 are coincident, whereas the axis 81 of the eccentric 80 is always radially spaced from the axis of the shaft 62. The throw of the driven crank 46 is a minimum at this time since the axes of the shaft 62 and the eccentric 82 are coincident.

When the manual switch 138 is opened, the electromagnetic coil 118 is deenergized whereupon the spring 108 will move the armature 104 from the position of FIGURE 11 to the position of FIGURE 6, and in so doing open the running switch contacts 114 and 116. Concurrently therewith the pinion 100 is rotated in the clockwise direction throughout 180° from the position of FIGURE 18 to the position of FIGURE 19. Since the switch 138 can be opened at any time, it is entirely possible that angular movement of the armature 104 and the shifter disc 92 will be precluded by the cam stop 86, but within a maximum of the angular extent of the cam stop, the shifter disc 92 will rotate to the position of FIGURE 19. Thereafter, during continued rotation of the shaft 62 and the disc 84, the stop portion 88 will abut the lug 98 on the shifter disc 92 and again arrest rotation of the disc 84 and the eccentric 82. Continued rotation of the eccentric 80 relative to the eccentric 82 will cause the axis 83 of the eccentric 82 to shift radially so that the axis 81 of the eccentric 80 is between the axis 63 of the shaft 62 and the axis 83 of the eccentric 82. At this point the throw of the crank 46 is a maximum so that the stroke end limits of the wiper blades will be extended to the angle D at the outboard position and the angle C at the inboard position. However, as the running switch contacts 114 and 116 are opened, the motor 50 will be deenergized automatically when the wiper blades arrive at their depressed parked positions due to automatic opening of the parking switch contacts 122 and 124 by the cam 128. During the parking cycle the lug 98 on the shifter disc 92 is located radially outward of the outer periphery of the cam stop 86. It can be seen that during running operation the throw of the driven crank 46, that is, the radial distance between the axis 63 of the shaft 62 and the axis of the crank pin 44 is the distance Y in FIGURE 9, which is less than the throw of the crank X, as seen in FIGURES 2 and 4, which is the radial distance between the axis 63 of the shaft 62 and the axis of the crank pin 44 during parking operation.

While the embodiment of the invention as herein disclosed constitutes a preferred form, it is to be understood that other forms might be adopted.

What is claimed is defined as follows:

1. Variable throw crank means for actuating a windshield wiper including in combination, a rotatable shaft, a first eccentric attached to said shaft, a disc having a second eccentric mounted on said eccentric so as to normally rotate therewith, said disc having an arcuate cam stop thereon with a substantially radially extending stop portion, a crank journalled on said second eccentric, means operatively connecting said shaft and said crank for imparting rotation thereto, two position abutment means engageable with the stop portion of said cam stop for arresting rotation of said disc for a fraction of a revolution of said first eccentric and said crank and thereafter automatically releasing said disc for rotation with said first eccentric so as to vary the throw of said crank.

2. Variable throw crank means for actuating a windshield wiper including in combination, a rotatable shaft, a first eccentric attached to said shaft, a disc having a second eccentric mounted on said first eccentric so as to normally rotate therewith, said disc having an arcuate cam stop thereon with a substantially radially extending stop portion, a crank journalled on said second eccentric, a drive arm connected to said shaft, a pin and slot connection between said drive arm and said crank for imparting rotation thereto, and two position abutment means engageable with the stop portion of said cam stop for arresting rotation of said disc for a fraction of a revolution of said first eccentric and said crank and thereafter automatically releasing said disc for rotation with said first eccentric so as to vary the throw of said crank.

3. Variable throw crank means for actuating a windshield wiper including in combination, a housing, a rotatable shaft journalled in said housing, a first eccentric keyed to said shaft, a disc having a second eccentric mounted to said first eccentric so as to normally rotate therewith, said disc having an arcuate cam stop therein with a substantially radially extending stop portion, a crank journalled on said second eccentric, means operatively connecting said shaft and said crank for imparting rotation thereto, and two position rotary abutment means journalled in said housing eccentrically of said shaft and engageable with the stop portion of said cam stop for arresting rotation of said disc for a fraction of a revolution of said first eccentric and said crank and thereafter automatically releasing said disc for rotation with said first eccentric so as to vary the throw of said crank.

4. Variable throw crank means for actuating a windshield wiper including in combination, a rotatable shaft, a first circular eccentric keyed to said shaft, a disc having a circular aperture frictionally receiving the first circular eccentric so as to normally rotate therewith and having a second circular eccentric, a crank arm having a circular aperture within which the second circular eccentric on said disc is disposed and about which said crank arm is journalled, said disc having an arcuate cam stop thereon with a substantially radial stop portion, means operatively connected to said shaft and said crank for imparting rotation thereto, and two position rotary abutment means engageable with the stop portion of said cam stop for arresting rotation of said disc for a fraction of a revolution of said first eccentric and said crank and thereafter automatically releasing said disc for rotation with said first eccentric and thus vary the throw of said crank.

5. Windshield wiper actuating and control mechanism including, a unidirectional electric motor, a rotary driving member connected to said motor, an energizing circuit for said motor including a running switch and a parking switch connected in parallel, an electromagnet for controlling said running switch and a manual switch for controlling energization of said electromagnet, a rotary crank, means operatively connecting the driving member and said crank for imparting rotation thereto, double eccentric means arranged between said driving member and said crank for varying the throw thereof, means automatically operable to effect relative rotation between said double eccentric means upon energization and deenergization of said electromagnet, and means operable to cyclically open said parking switch during each revolution of said rotary driving member.

6. Windshield wiper actuating and control mechanism including, a unidirectional electric motor, a rotary driving member connected to said motor, an energizing circuit for said motor including a running switch and a parking switch connected in parallel, an electromagnet for controlling said running switch and a manual switch for controlling energization of said electromagnet, a rotary crank, means operatively connecting said driving member and said crank for imparting rotation thereto, a first and a second eccentric frictionally coupled together for rotation in unison but capable of relative rotation, said first eccentric being attached to said driving means for rotation therewith, said crank being journalled on said second eccentric, means automatically operable to effect relative rotation between said first and second eccentrics upon energization and deenergization of said electromagnet, and means operable to cyclically open said parking switch during each revolution of said driving member.

7. The combination set forth in claim 6 wherein said second eccentric has an arcuate cam stop thereon with a substantially radial stop portion.

8. The combination set forth in claim 7 wherein the means operable to effect relative rotation between said first and second eccentric comprises two position rotary abutment means engageable with the stop portion of said cam stop.

9. The combination set forth in claim 8 wherein said two position rotary abutment means comprises a disc having an abutment lug thereon.

10. The combination set forth in claim 9 wherein said disc is attached to a shaft, a pinion gear on said shaft, and wherein said electromagnet includes an armature having a sector gear thereon meshing with said pinion gear.

No references cited.